United States Patent
Chang et al.

(10) Patent No.: US 7,148,818 B2
(45) Date of Patent: Dec. 12, 2006

(54) METHOD OF COMMAND ENTRY FOR AN ELECTRONIC DEVICE

(75) Inventors: Kun-Chang Chang, Taipei (TW); Chien-Chun Ma, Taipei (TW); Tung-Wei Kao, Taipei (TW)

(73) Assignee: Lite-On IT Corporation, Taipei (TW)

( * ) Notice: Subject to any disclaimer, the term of this patent is extended or adjusted under 35 U.S.C. 154(b) by 557 days.

(21) Appl. No.: 10/682,465

(22) Filed: Oct. 9, 2003

(65) Prior Publication Data

US 2004/0085214 A1    May 6, 2004

(30) Foreign Application Priority Data

Oct. 15, 2002 (TW) .............................. 91123756 A

(51) Int. Cl.
*H03K 17/94* (2006.01)
(52) U.S. Cl. .................. 341/20; 340/825.24; 708/169
(58) Field of Classification Search .................. 341/20, 341/22; 340/825.22, 825.24; 708/145, 169
See application file for complete search history.

(56) References Cited

U.S. PATENT DOCUMENTS

| 4,374,425 | A | * | 2/1983 | Fuka .......................... 708/145 |
| 5,184,120 | A | * | 2/1993 | Schultz .................. 340/870.38 |
| 5,276,311 | A | * | 1/1994 | Hennige ...................... 235/380 |
| 6,131,047 | A | * | 10/2000 | Hayes et al. ................. 455/566 |

* cited by examiner

*Primary Examiner*—Timothy Edwards, Jr.
(74) *Attorney, Agent, or Firm*—Thomas, Kayden, Horstemeyer & Risley

(57) ABSTRACT

A method of command entry for an electronic device. First, a single button is pressed to enter the electronic device into a multi-function entry state, indicated by a first light status. The button is pressed again within a first predetermined period after entering the multi-function entry state, corresponding to one command. The light indicator displays a second light status corresponding to the command. Finally, the button is pressed again to confirm the command within a second predetermined period.

11 Claims, 2 Drawing Sheets

METHOD OF COMMAND ENTRY FOR AN ELECTRONIC DEVICE

BACKGROUND OF THE INVENTION

1. Field of the Invention

The present invention relates to a method of command entry for an electronic device, and in particular to a method utilizing a single button and a light indicator to expand functionality.

2. Description of the Related Art

Control buttons on CD-ROM drives have limited functionality, since there is limited space on the external surfaces thereof.

In order to enhance usability, additional function buttons can provide multiple functions according to the length of time pressed. For example, a CD-ROM drive can execute a first function when a function button is pressed for one second, and a second function when pressed longer.

However, even with varying lengths of pressing time providing multiple functions, limitations are still presented by the existence of a single button. Manufacturers can add more buttons to increase functions, but this raises costs.

In view of the foregoing, there is a need for a method for providing increased CD-ROM functionality with a single button.

SUMMARY OF THE INVENTION

Accordingly, the invention utilizes a single button to provide multiple functions for an electronic device according to update firmware.

The invention provides a method of command entry for an electronic device. First, a single button enters the electronic device into a multi-function entry state, indicated by a first light status. The button is pressed within a first predetermined period to input a corresponding command.

The present invention also provides another method of command entry for an electronic device. First, a single button enters the electronic device into a multi-function entry state, indicated by a first light status. The button is pressed again within a first predetermined period after entering the multi-function entry state to input a corresponding command. A light indicator displays a second light status corresponding to the command. Finally, the button is pressed again within a second predetermined period to confirm the command.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
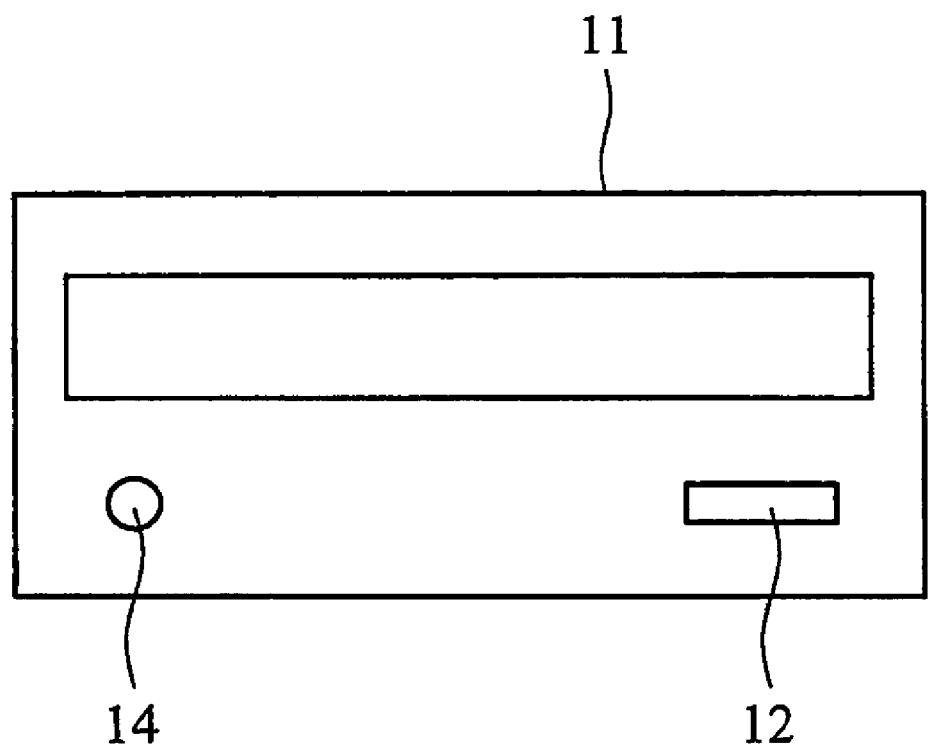
FIG. 1 is a schematic view of a CD-ROM drive according to the present invention.

FIG. 1 is a schematic view of a CD-ROM drive according to the present invention. The present invention provides three stages of command entry for an electronic device.

In the first stage, a specific command is selected for a CD-ROM drive 11 according to the number of times a button 12 is pressed. For example, the CD-ROM drive 11 performs a play function when the button 12 is pressed once, stop function when the button 12 is pressed twice, pause function when the button 12 is pressed three times, next track function when the button 12 is pressed four times, and previous track function when the button 12 is pressed five times.

In the second stage, a light indicator 14 blinks according to the number of times the button 12 is pressed in the first stage, indicating the specific command.

Finally, in the third stage, the button 12 is pressed again to confirm the specific command and the CD-ROM drive 11 performs the specific command.

While the invention is described using a CD-ROM drive as an example, the invention is not limited thereto.

Figure 2:
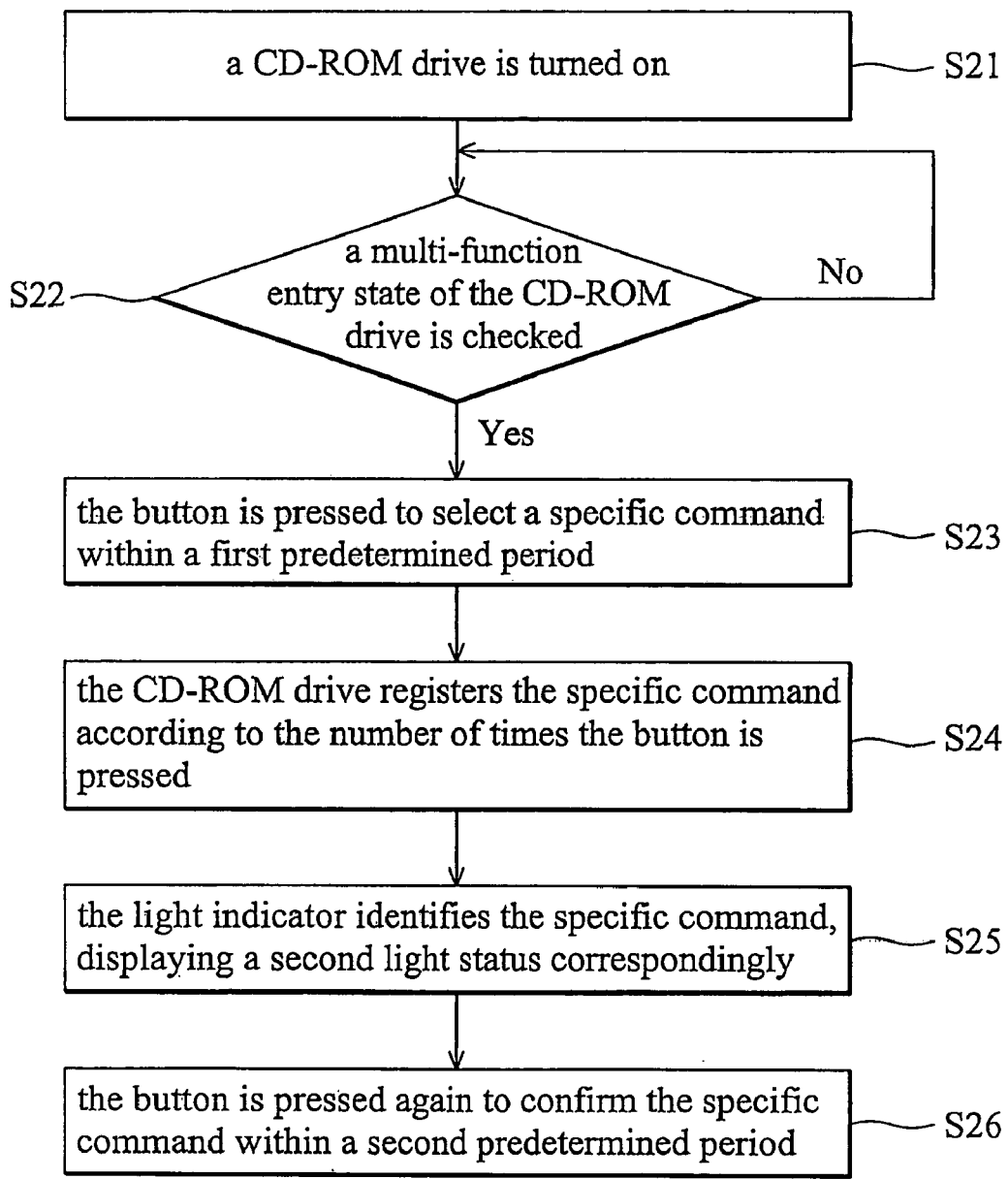
FIG. 2 is a flowchart illustrating the method of command entry for an electric device according to the present invention.

FIG. 2 is a flowchart illustrating the method of command entry for an electric device according to the present invention.

First, in step S21, a CD-ROM drive is turned on. In step S22, a multi-function entry state of the CD-ROM drive is checked. The button is pressed to enter the CD-ROM drive into a multi-function entry state.

If the CD-ROM drive is not in the multi-function entry state, the button only controls tray functions.

If the CD-ROM drive is in the multi-function entry state, in step S23, the button is pressed to select a specific command within a first predetermined period. The light indicator indicates a first light status with a first color light (red light) or continuous blinking. The specific command is selected according to the number of times the button is pressed within the first predetermined period. For example, the CD-ROM drive can perform play function when the button is pressed once.

In step S24, the CD-ROM drive registers the specific command according to the number of times the button is pressed.

In step S25, the light indicator identifies the specific command, displaying a second light status correspondingly. For example, the light indicator can blink three times when the button is pressed three times.

In step S26, the button is pressed again to confirm the specific command within a second predetermined period. The CD-ROM performs the specific command.

The present invention's method of command entry utilizes a single button and light indicator, providing multiple functions with no increase in buttons needed, reducing cost and enabling easily understood light indications corresponding to the multiple functions.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of command entry for an electronic device, comprising the stages of:

pressing a single button to enter the electronic device into a multi-function entry state;

directing a light indicator to display a first light status corresponding to the multi-function entry state;

inputting a command to the electronic device by pressing the button again within a first predetermined period;

directing the light indicator to display a second light status corresponding to the command; and confirming the command by pressing the button again within a second predetermined period.

2. The method as claimed in claim 1, wherein the electronic device is entered into the multi-function entry state by pressing the button several times.

3. The method as claimed in claim 1, wherein the electronic device is entered into the multi-function entry state by continuously pressing the button.

4. The method as claimed in claim 1, wherein the light indicator displays a first color in the first light status.

5. The method as claimed in claim 1, wherein the light indicator continuously blinks in the first light status.

6. The method as claimed in claim 1, wherein the command corresponds to the number of times the button is pressed.

7. The method as claimed in claim 1, wherein the light indicator continuously blinks in the second light status.

8. The method as claimed in claim 1, wherein the light indicator displays a second color in the second light status.

9. The method as claimed in claim 1, wherein the number of times the button is pressed corresponds to the number of the light indicator blinks in the second light status.

10. The method as claimed in claim 1, further comprising entering the light indicator into a third light status before pressing the button again to confirm the command.

11. The method as claimed in claim 10, wherein the light indicator displays a third color in the third light status.

* * * * *